a2

US008024650B2

(12) United States Patent
Carlson et al.

(10) Patent No.: US 8,024,650 B2
(45) Date of Patent: Sep. 20, 2011

(54) DRILLING ON ELEMENTS IN ARBITRARY AD-HOC REPORTS

(75) Inventors: Jason David Carlson, Redmond, WA (US); Robert Alan Meyers, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 11/396,148

(22) Filed: Mar. 31, 2006

(65) Prior Publication Data

US 2007/0233666 A1 Oct. 4, 2007

(51) Int. Cl.
*G06F 17/00* (2006.01)
*G06F 17/30* (2006.01)

(52) U.S. Cl. ........ 715/212; 715/234; 715/255; 707/716; 707/754

(58) Field of Classification Search .................. 715/200, 715/201, 204, 205, 210, 212, 215, 219, 220, 715/226, 227, 229, 231, 234, 243, 253, 255, 715/273, 760; 707/1–4, 6, 7, 100, 102, 200, 707/201, 601, 602, 713, 714, 716, 717, 754, 707/763, 769, 774, 805, 999.001, 999.1, 707/999.102
See application file for complete search history.

(56) References Cited

U.S. PATENT DOCUMENTS

| 5,603,025 | A | * | 2/1997 | Tabb et al. | 707/2 |
|---|---|---|---|---|---|
| 5,666,528 | A | | 9/1997 | Thai | 395/613 |
| 5,845,278 | A | | 12/1998 | Kirsch et al. | 707/3 |
| 5,937,155 | A | * | 8/1999 | Kennedy et al. | 714/38 |
| 6,018,733 | A | | 1/2000 | Kirsch et al. | 707/3 |
| 6,160,549 | A | * | 12/2000 | Touma et al. | 715/762 |
| 6,195,653 | B1 | * | 2/2001 | Bleizeffer et al. | 707/2 |
| 6,539,370 | B1 | * | 3/2003 | Chang et al. | 707/2 |
| 6,549,907 | B1 | | 4/2003 | Fayyad et al. | 707/101 |
| 6,584,464 | B1 | | 6/2003 | Warthen | 707/4 |
| 6,631,402 | B1 | * | 10/2003 | Devine et al. | 709/217 |
| 6,801,910 | B1 | * | 10/2004 | Bedell et al. | 1/1 |
| 6,804,664 | B1 | | 10/2004 | Hartman et al. | 707/3 |
| 6,829,605 | B2 | | 12/2004 | Azzam | 707/5 |
| 6,850,933 | B2 | * | 2/2005 | Larson et al. | 1/1 |
| 6,925,463 | B2 | | 8/2005 | Bhattacharjee et al. | 707/3 |
| 6,993,533 | B1 | * | 1/2006 | Barnes | 707/999.102 |
| 6,996,569 | B1 | * | 2/2006 | Bedell et al. | 707/737 |
| 7,051,038 | B1 | * | 5/2006 | Yeh et al. | 707/102 |

(Continued)

FOREIGN PATENT DOCUMENTS

CA 1 265 871 2/1990

(Continued)

OTHER PUBLICATIONS

"Powerplay Enterprise Server Guide," Cognos Inc., Apr. 24, 2002, pp. 57-62.*

(Continued)

*Primary Examiner* — Maikhanh Nguyen
(74) *Attorney, Agent, or Firm* — Woodcock Washburn LLP

(57) ABSTRACT

Mechanisms are provided for drilling on data elements in arbitrary ad-hoc reports. Data elements in one ad-hoc report can be examined and then drilled on, in order to obtain other related data elements in other ad-hoc reports. Thus, in one exemplary aspect of the disclosure, when a user selects a data element in an ad-hoc report, another ad-hoc report is generated containing data elements that are obtained as a result of taking into account 1) the original query associated with data element in the ad-hoc report; 2) the context of the selection in the ad-hoc report, and 3) the granularity of the resulting query associated with the resulting ad-hoc report.

16 Claims, 7 Drawing Sheets

U.S. PATENT DOCUMENTS

| | | | |
|---|---|---|---|
| 7,139,766 B2 * | 11/2006 | Thomson et al. | 707/101 |
| 7,152,200 B2 * | 12/2006 | Albert et al. | 715/234 |
| 7,222,130 B1 * | 5/2007 | Cras et al. | 707/803 |
| 7,406,468 B2 * | 7/2008 | Larson et al. | 1/1 |
| 7,720,867 B2 * | 5/2010 | Subramanian et al. | 707/793 |
| 2003/0225768 A1 | 12/2003 | Chaudhuri et al. | 707/10 |
| 2004/0034615 A1 * | 2/2004 | Thomson et al. | 707/1 |
| 2004/0111410 A1 | 6/2004 | Burgoon et al. | 707/4 |
| 2004/0139102 A1 * | 7/2004 | Vierich et al. | 707/102 |
| 2005/0034064 A1 * | 2/2005 | Meyers et al. | 715/513 |
| 2005/0039033 A1 * | 2/2005 | Meyers et al. | 713/193 |
| 2006/0184584 A1 * | 8/2006 | Dunn et al. | 707/200 |
| 2007/0130517 A1 * | 6/2007 | Wu | 715/530 |
| 2007/0233680 A1 | 10/2007 | Carlson et al. | |

FOREIGN PATENT DOCUMENTS

| | | | |
|---|---|---|---|
| WO | 99/09492 | * | 2/1999 |
| WO | WO 01/55937 A2 | * | 8/2001 |

OTHER PUBLICATIONS

Celentano et al., "Template-Based Generation of Multimedia Presentations", International J. of Software Engineering and Knowlegde Engineering, 2003, pp. 419-445.*

"Generate ad-hoc reports with Microsoft reporting services," Dev×DevX.com, downloaded from the Internet on Jan. 30, 2006, http://www.devx.com/dbzone/Article/28047, 4 pages.

Information Builders, "Query and analysis," *WebFOCUS*, http://www-winformationbuilders.com/products/webfocus/pdf/productbrief.pdf, 8 pages.

White, C.J., "The role of BI in optimizing corporate business performance," *Corporate Performance Optimization Guide*, 2003, *Version 2*, 1-9.

Wolfe, J.S., "Ad hoc query: A reusable database access capability," *ACM*, 1994, 17-27.

* cited by examiner

DRILLING ON ELEMENTS IN ARBITRARY AD-HOC REPORTS

CROSS-REFERENCE TO RELATED SUBJECT MATTER

The present application is related to application Ser. No. 11/396,174 filed Mar. 3, 2006, entitled "Auto-Generating A Report Based On Metadata".

FIELD OF TECHNOLOGY

The present subject matter relates to the field of computing, and more particularly, to databases, although databases are merely an exemplary and non-limiting field of the presently disclosed subject matter.

BACKGROUND

A typical database may contain hundreds if not thousands of entities. Such entities may relate to other entities in a myriad of ways. If users want to perform queries on such entities, for instance, to look up certain attributes associated with the entities, they may perform a database search that will result in a report. Such a report, moreover, may have a myriad of data elements as a result of the queries. However, if the report does not reflect exactly the contents of the intended queries or results the users hoped for, the queries may have to be performed again. Alternatively, the reports themselves may be further probed in order to arrive at the desired result—for example, by writing complex algorithms to capture the result.

Ad-hoc reports are an excellent way to empower end users to get exactly the information they may need or want. However, ad-hoc reports typically suffer from a lack of interactivity. Analytical views, on the other hand, may provide rich interactivity, but suffer from a lack of flexibility to get exactly the data needed (without involving a technical designer to modify the database model that underlies the views). Thus, to emulate the interactivity of analytical views and to provide the data honing ability of ad-hoc reports, it would be advantageous to provide mechanisms that allow for rich interactivity and flexibility when a user creates an ad-hoc report.

SUMMARY

The above mentioned mechanisms allow for drilling on data elements in arbitrary ad-hoc reports, thereby allowing users to flexibly interact with such reports. In one aspect of the presently disclosed subject matter, an ad-hoc report is configured so that its data elements can be selected by users, thus allowing the users to drill through the ad-hoc report to data elements in other ad-hoc reports. For example, users can click on data elements in such ad-hoc reports to eventually arrive (potentially many clicks later) at other ad-hoc reports that contain data elements of interest to the users.

The aforementioned drilling is accomplished by using an original query associated with a data element in an ad-hoc report, a context of the click, and a granularity of a destination query associated with the new data element of interest. The original query provides the starting point of a drill, the granularity specifies the ending point of the drill, and the context of the click helps to determine the type of data elements the user is after. If a user clicks (or somehow otherwise selects) a specific data element in a first ad-hoc report, another ad-hoc report can be generated that will have data elements related to the former data elements.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

Per the Brief Description of the Drawings, FIGS. 1-5 provide herein a general discussion of various aspect of drilling through on data elements in arbitrary ad-hoc reports. Following this discussion, various exemplary (and hence non-limiting) implementations are discussed in FIGS. 5-7. All these aspects are provided herein to detail mechanisms for rich interactivity and flexibility when a user creates an ad-hoc report. Such mechanism include the concepts of infinite drilling, drilling along multiple paths, and so on. At a very high level, they include the use of an original query, the context of a user click, and the granularity of the resulting query.

Aspects of Drilling on Elements in Arbitrary Ad-Hoc Reports

Figure 1:
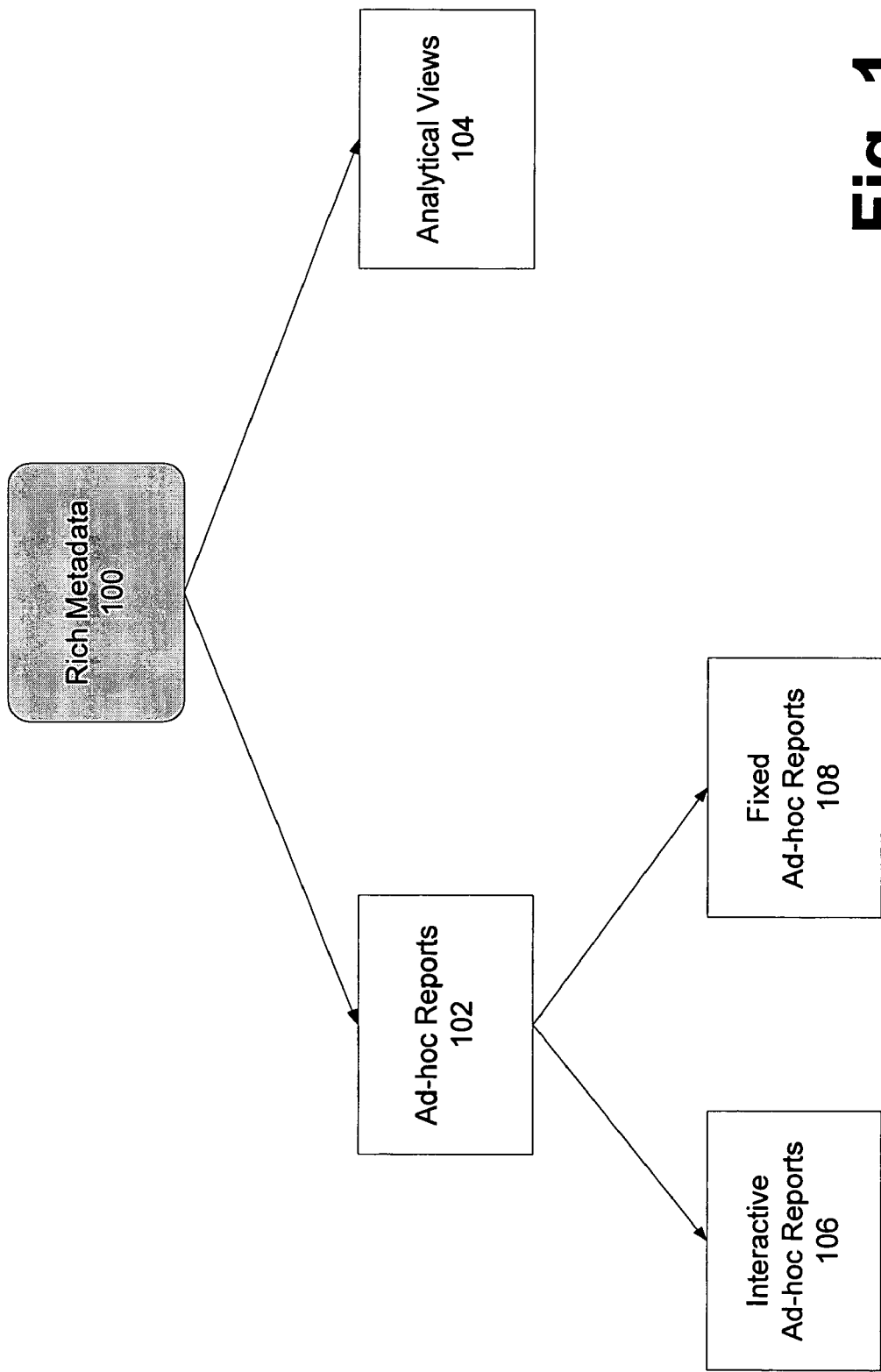
FIG. 1 illustrates where interactive ad-hoc reports fall into the hierarchy of the types of objects which may result from rich metadata.

FIG. 1 illustrates where interactive ad-hoc reports fall into the hierarchy of the types of objects which may result from rich metadata. Of course, this hierarchy is merely exemplary and hence non-limiting, intended to show the relationship of interactive ad-hoc reports to other reports and other structures, such as analytical views. Thus, in FIG. 1, rich metadata 100 is shown. Such rich metadata 100 may describe the structure of entities residing in a database and any associated reports which may result from queries on these entities. The metadata 100 may also provide information on not only the entities and their attributes, but also the relationships between entities.

Ad-hoc reports 102 may be at least partly based on the rich metadata 100, as well as analytical views 104. Those of skill in the art will readily appreciate the different kinds of entities, structures, and so on, which may be based on such rich metadata 100. Thus, Ad-hoc reports 102 may be of two varieties. Interactive (or dynamic) ad-hoc reports 106 and fixed ad-hoc reports 108. These latter types of reports 108, are fixed in that they may not provide for interactivity, such as drilling through to other data elements in other reports. The interactive reports 106, on the other hand, allow for user interaction so that users can, for example, click on data elements in these reports 106, and these data elements may lead the users to other data elements in other reports.

The analytical views 104, in contrast to ad-hoc reports 102 in general, typically allow for interactivity, but are limited capturing the types of data elements users may desire. Thus, for example, even though analytical views 104 may allow for user manipulation of data elements, the domain of such analytical views 104 may be limited by their underlying database model. Put in other words, while analytical view may provide for interactivity, they are not always adept at capturing the types of information users may be after.

Thus, interactive ad-hoc reports 106 provide the best of both worlds (from the ad-hoc world and the analytical view world), because they allow for interactivity and for easy capture (in ad-hoc fashion) of the types of data elements users may be interested in. The remaining discussion focuses on the various aspects of how drilling can be accomplished in ad-hoc reports, hence rendering them interactive.

Figure 2:
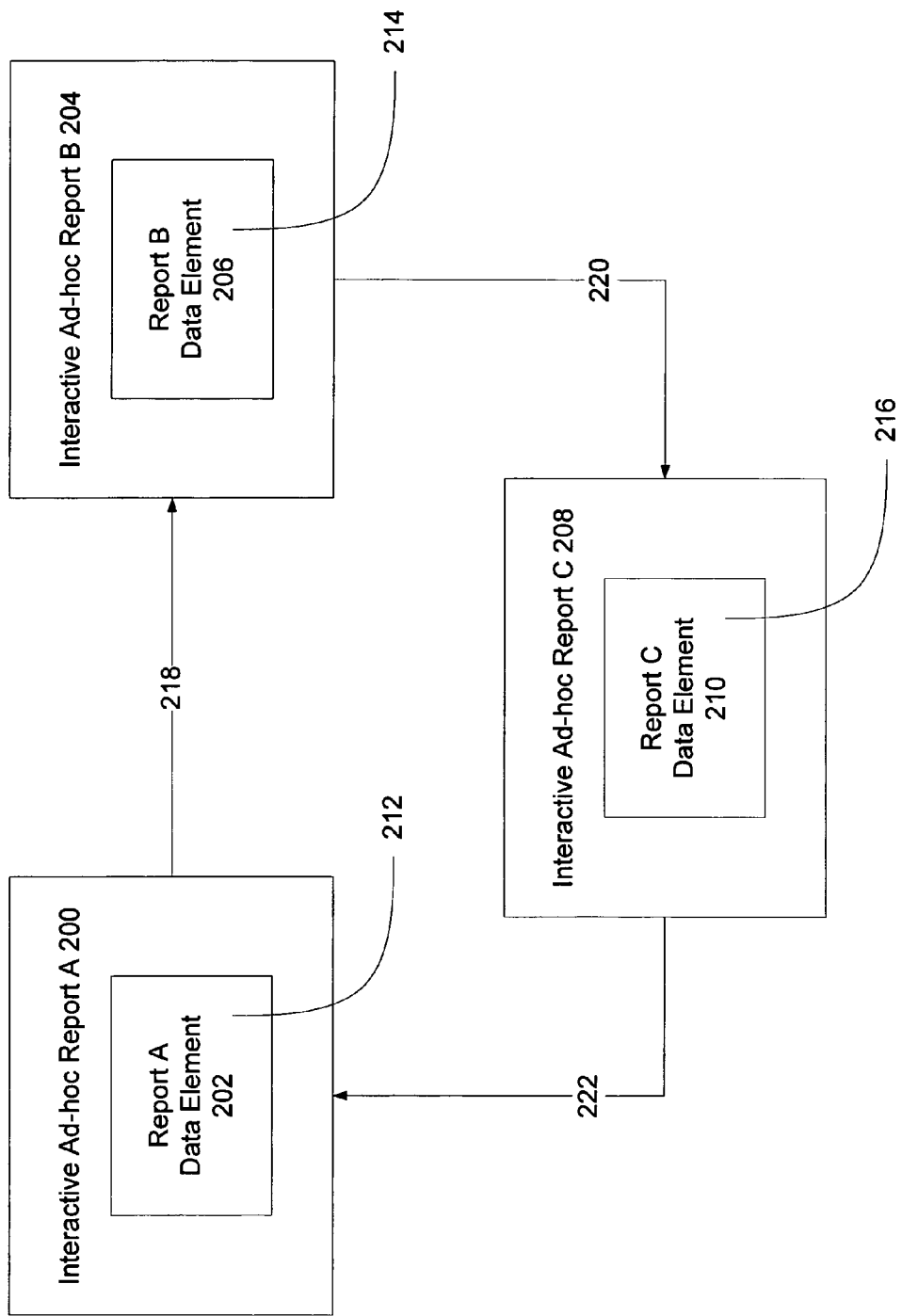
FIG. 2 illustrates that interactive ad-hoc reports may link-up with other interactive ad-hoc reports based on user-clicking of the data elements in the interactive ad-hoc report.

In one such aspect, FIG. 2 illustrates that interactive ad-hoc reports may link-up with other interactive ad-hoc reports based on user-clicking of the data elements in the interactive ad-hoc report. In FIG. 2, interactive ad-hoc report A 200 is shown, and such a report 200 may have some data element A 202 (a typical report, of course, will have a plurality of such data elements). If a user clicks 212 on the data element A 202, this data element 202 will link 218 the user to other data elements in other ad-hoc reports (where the ad-hoc reports may be created dynamically, with the help of rich metadata 100, upon the clicking of the data element A 202).

Per FIG. 2, a click 212 on data element A 202 may lead a user to interactive ad-hoc report B 204, which may contain its own data elements B 206. Such data elements 206 may be related to the previous data elements A 202 in numerous ways (as will be discussed in greater detail, below). One way these data elements 202, 206 may be related is via the context in which a user clicks 212 the source data element 202 (rendering data element B 206, then, the target data element or the destination data element in ad-hoc report B 204).

Interestingly, the user can then click 214 on this data element B 206 in report B 204, and thus generate other ad-hoc reports that will contain further data. In FIG. 2, when a user clicks 214 on data element B 206, ad-hoc report C 208 may be dynamically created. This report 208 may contain data element C 210. Finally, the user can click on this data element C 210, and this click may take the user back to the original data element A 202 in the first ad-hoc report A 200. This process of surfing between ad-hoc reports 200, 204, 208 may be infinite.

To make the discussion so far more concrete, the following prosaic example is given. Ad-hoc report A 200 may be a report on the sales of a certain company. If an employee wants to see more details about sales and how they are related to, say, the products the company manufactures, that employee can click 212 on the sales data element (in this example corresponding to data element A 202). The click 212 may then link 218 to some products ad-hoc report—in this case, corresponding to report B 204. Once the employee sees the products data, he may yet again click 220 on some particular products data element to see, for example, the return rate for that product. The return rate, in turn, may be generated in another ad-hoc report (in FIG. 2, corresponding to report C 208). Once this is accomplished, the user may click 216 on the return rate data element, and this data element may link 222 the user to the original ad-hoc report (in FIG. 2, corresponding to report A 200). This, of course, is merely a very simple and non-limiting example of the general concepts shown in FIG. 2 and discussed above.

Figure 3:
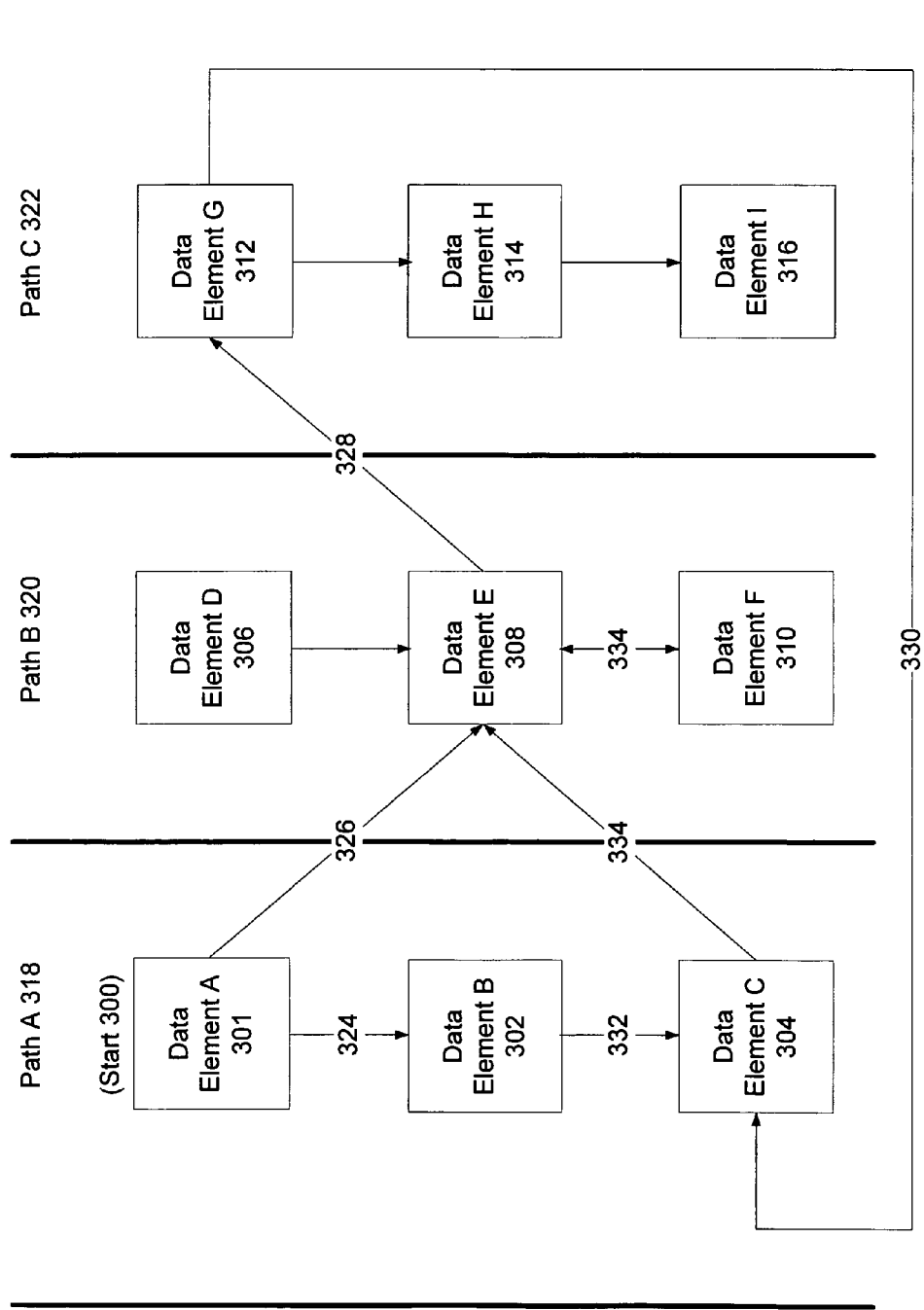
FIG. 3 illustrates the notion of infinite drilling of data elements in ad-hoc reports, which may include drilling down on a report or drilling through a report.

Such linking between ad-hoc reports leads to the subject matter shown in FIG. 3. Specifically, FIG. 3 illustrates the notion of infinite drilling of data elements in ad-hoc reports, which may include drilling down on a report (such as taking some portion of a current report and breaking it out to a lower level of granularity) or drilling through to a new a report. As in FIG. 2, in FIG. 3 various data elements 301, 302, 304, 306, 308, 310, 312, 314, 316 are shown. These data elements may be set in various paths 318, 320, 322.

Path A 318 may have data elements A 301, B 302, and C 304. Starting 300 at data element A 301, a user may wish to drill down on data element A 301 in order to get more details on this data element 301. Thus, a user may select or click on data element A 301 and thereby drill down 324 to an underlying data element B 302. For instance, if data element A 301 provides information for a particular customer, data element B 302 can provide the home address of that customer. Moreover, the user can keep drilling down 332 to a further data element C 304, which, for example, may have the daytime phone number of that customer. Another example of drilling down would be drilling from a yearly report down to a monthly report, down to a weekly report, down to a daily report, and so on.

However, the user can not only drill down on data elements, but may also drill through to other data elements along different paths. Thus, starting 300 with data element A 301 again, the user can select data element A 301 and drill through 326 to data element E 308, which is in path B 320. This data element E 308, for instance, can provide information regarding the region in which the customer resides. Such drilling through to data elements and drilling down to data elements can be infinite, since user can keep drilling without having to stop—assuming the data elements are linked in the first place (as they will be, given how rich metadata can associate reports—as discussed above).

To give one example of this infinite drilling capability of the presently disclosed subject matter, a user can start 300 at data element A 301, drill 326 to data element E 308 (in path B 320), then drill 328 to data element G 312 (in path C 322), then drill 330 to data element C 304 (taking the user back to path A 318), and finally drill 334 back to data element E 308. Of course, it may be the case that once at data element E 308, the user may drill down 334 to data element F 310, at which point the user may not be able to drill down anymore. However, because the drilling described herein is infinite, the user can drill back up to data element E 308 (hence the double directioned arrow; the other drill arrows are unidirectional only for simplicity's sake, to make the present discussion more manageable, simple, and clear—those of skill in the art will readily appreciate how user could also drill up on data elements).

Alternatively, even if a user reaches the bottom most data element (for example, the most specific data element on a path, per the daytime phone number example given above), such as data element C 304, the user can drill through 334 to some other data element (other than a data element directly above, as was the case with data elements E 308 and F 310, and as would be the case with data element 302). That other data element, in FIG. 3, would be data element E 308. The drilling possibilities described herein are truly infinite, because the user can keep going from data elements in one ad-hoc report to data elements in another ad-hoc reports without ever having to stop. The nature of ad-hoc reports is such that they can be generated at any time and dynamically, so that as long as there is some relationship between data elements, drilling from one report to the next is not limited.

Figure 4:
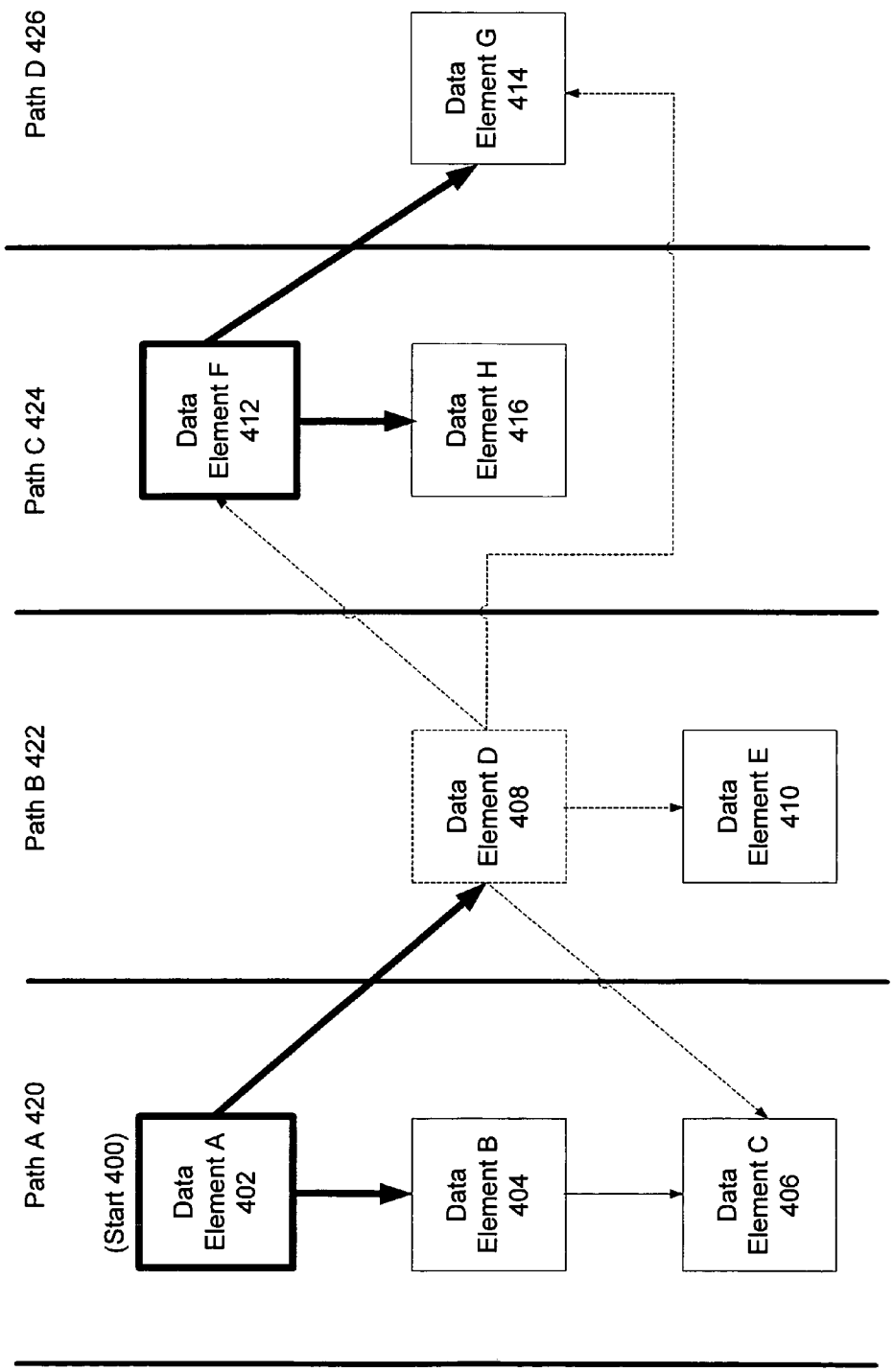
FIG. 4 illustrates the notion of multiple drill paths which may give users the choice of drilling down or through more than one drill path.

Next, in another aspect of the presently disclosed subject matter, FIG. 4 illustrates the notion of multiple drill paths which may give users the choice of drilling down and/or through more than one drill path. As before, starting 400 with data element A 402, a user may have a choice as to drilling down to data element B 404 or drilling through to data element D 408. Thus, drilling may entail multiple drill paths, which the user (or maybe even an intelligent computerized module) can specify. Data element A 402 and its drill paths are highlighted in bold lines to show the two possibilities.

Suppose, for instance, that a user has chosen to drill through to data element D 408 (shown along with its drill paths in dashed lines, to distinguish it from the other data elements and drill paths). Once at data element D 408, four possible choice are present. The user may drill through back to path A 420 and data element C 406; drill down to data element E 410; drill through to data element F 412 in path C 414; or, drill through to data element G 414 in path D 426. In one exemplary aspect of the presently disclosed subject matter, the user may have to select the drill path in the case where not enough information is present to determine which data element is desired based on the context of the selection.

When at data element D 408, the user can select, for example, to drill through to data element F 412. Upon arrival on this data element 412, the user may yet again have to select which drill path to choose (either to data element H 416 or data element G 414. The user may select data element G 414, which may be the intended data element which the user is after. Interestingly, when the user was present at data element D 408, he could have drilled directly from data element D 408 to data element G 414 (without having to go through data element F 412). In another aspect of the presently disclosed subject matter, suggestions can be provided to the user regarding the most efficient route to take in order to get to the desired result. Alternatively, given the rich connectivity of drilling mechanism, the user can arrive at the desired path in the manner favored by the user (perhaps the user may want to go through data element F 412 to arrive at data element G 414, since this former data element 412 may also be of interest to the user).

Figure 5:
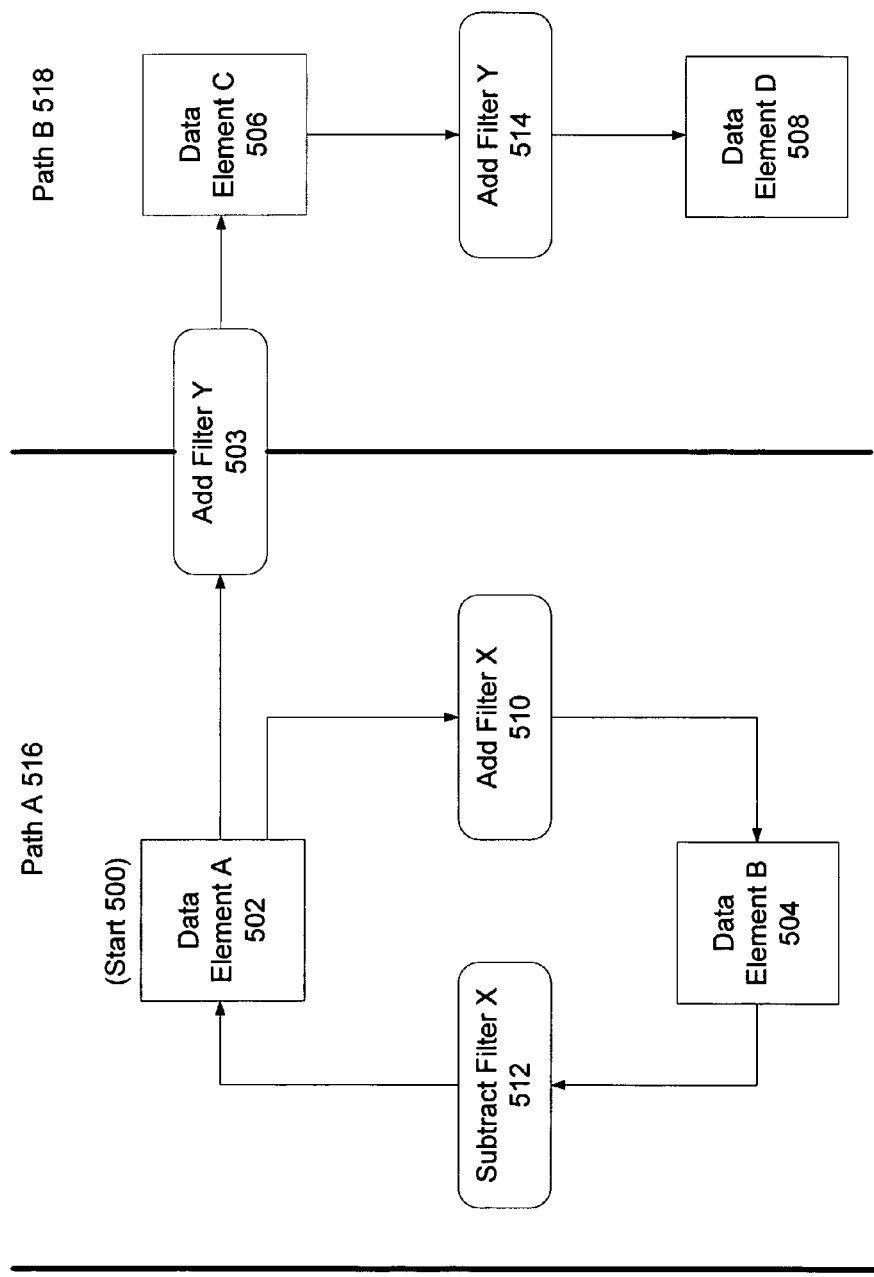
FIG. 5 illustrates an aspect of the present disclosure where context filters are used in the aforementioned drilling to data elements.

Next, FIG. 5 illustrates an aspect of the present disclosure where context filters are used in the aforementioned drilling to data elements. Starting 500 at data element A 502, if a user drills down to data element B 504, the context of the click on data element A 502 is taken into consideration. This context can be manifested as a filter, filter X 510, for example. This filter can consist of which result field was clicked on and what row in the result was clicked on (if the drilling is performed in a database—but, it is clearly not limited to databases).

Thus, upon arrival at data element B 504, context information is sustained, so that the user can more easily hone in on the desired data element. Alternatively, if the user decides to go back to data element A 502, filter X is subtracted or discarded 512. If the user is back at data element A 502, such a user may drill through to another data element, such as data element C 506. With the drilling, another filter Y 503 can be added. Retaining of context as the user keeps clicking on data elements, allows the user to retain information where the user has been, which may aid the user in ultimately reaching his final destination.

Figure 6:
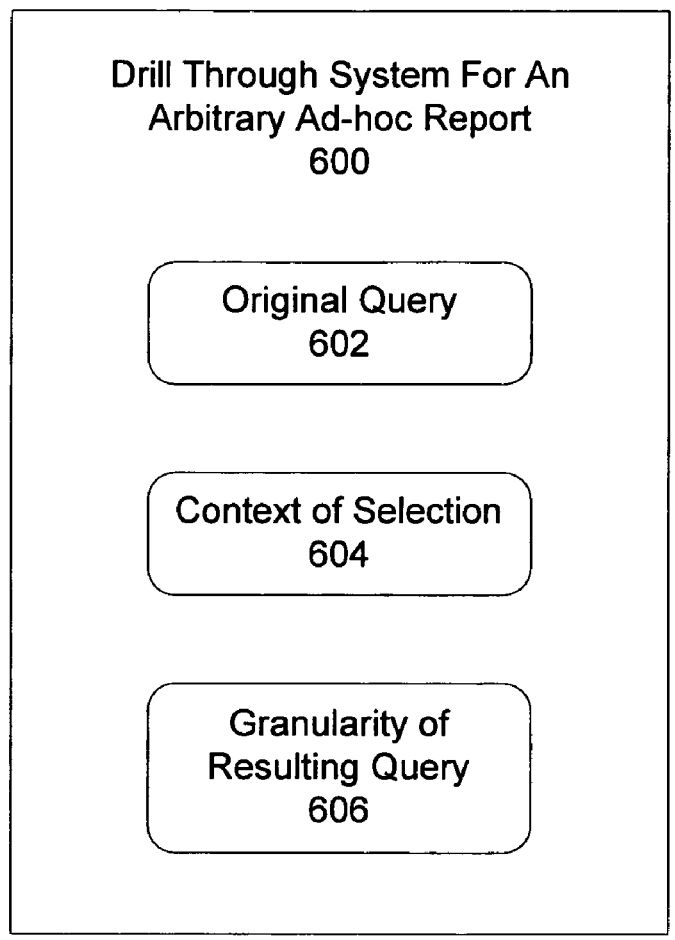
FIG. 6 illustrates an exemplary drill through on data elements system for an arbitrary ad-hoc report.
Figure 7:
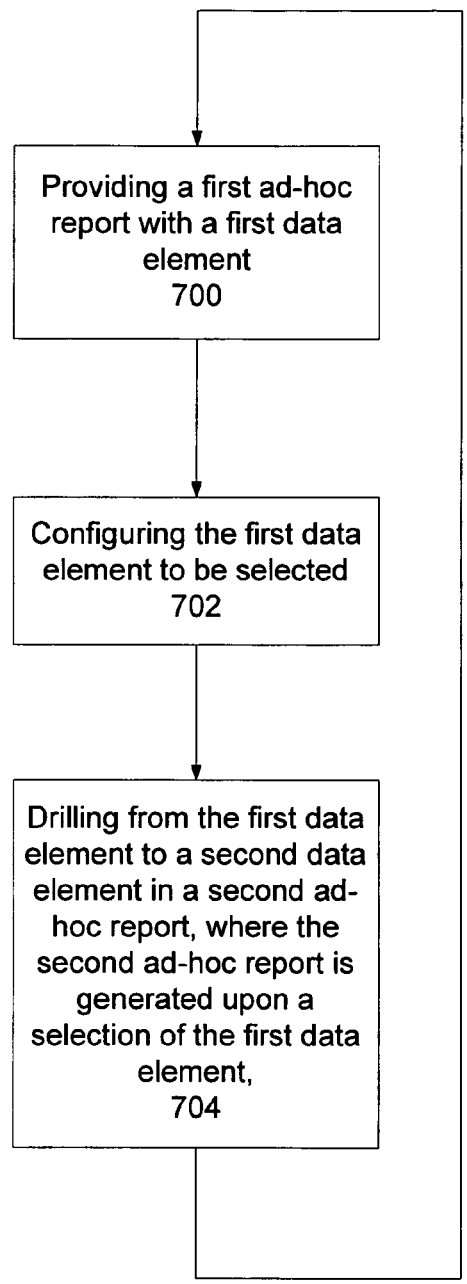
FIG. 7 illustrates in block diagram form one exemplary method implementation of drilling through data elements in an arbitrary ad-hoc report (which could also be implemented in computer readable medium format)

Aspects of General Implementations of Drilling on Elements in Arbitrary Ad-hoc Reports Next, FIGS. 6 and 7 illustrate several general implementations of the subject matter discussed so far. These implementations are merely exemplary and hence non-limiting. FIG. 6 illustrates an exemplary drill system on data elements for an arbitrary ad-hoc report. In FIG. 6, the system 600 contains, first of all, an original query 602 associated with a data element in an ad-hoc report. The query can serve as the basis for the ad-hoc report (i.e., the ad-hoc report can be generated as a result of the query). Second, the system 600 takes into account the context of a selection 604 made by a user. Thus, when a user selects the data element in the ad-hoc report, for example, by clicking with a mouse on the data element, the context of where the user has clicked helps to determine where the users intends the system to drill. If for example, the user clicks (e.g. via a user interface) on a data element such as a total, and this total is in a row containing sales for certain products, the system 600 can infer that the user wants to see more data elements in ad-hoc reports that have to do with sales of the product. In short, the context of selection 604 helps to hone-in on which data element will be shown in the following dynamically generated ad-hoc report.

Finally, third, the granularity of the resulting query 606 is considered by the system 600. This means that the system 600 takes into account which level of specificity for a particular data element should be shown (the resulting query is the basis for the newly generated ad-hoc report that will contain the particular data element). One level of granularity could be an overview of this data element; another level could have all the details associated with this data element, and so on. This, of course, is merely an exemplary implementation, and those skilled in the art will readily recognize the myriad of other implementations that could be constructed in view of FIG. 6 and the preceding discussion.

FIG. 7 illustrates one exemplary method for drilling on at least one data element in an arbitrary ad-hoc report. At block 700, a first ad-hoc report is provided, where the first ad-hoc report has some first data element. Next, at block 702, the first data element is configured to be selected. This means, that the data element can be chosen by a user, who may select it, for example, via a user interface by clicking on it.

Then, at block 704, drilling can be performed from the first data element to a second data element in a second ad-hoc report, where the second ad-hoc report is generated upon a selection of the first data element. As mentioned already, such drilling can be accomplished by using an original query associated with the first data element, a context of the selection, and a granularity of a destination query associated with the second data element.

As the loop from block 704 back to block 700 suggests, this process can be continued indefinitely, allowing users to drill down on data, drill through data, and so on. As indicated above already, drilling can be performed from one path, where the first data element resides, to a second path, where the second data element resides. Alternatively, drilling can be performed on a path containing both the first data element and the second data element. Furthermore, the implementation of FIG. 7 could just as easily be implemented in computer readable format. In other words, drilling could be performed by a computing system on data that may be contained, for example, in a typical database.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, drilling through on data elements in arbitrary ad-hoc reports was discussed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for drilling on at least one element in an arbitrary ad-hoc report, comprising:
 a memory including a first data element residing in a generated first ad-hoc report stored in said memory; and
 a computer configured to generate a second ad-hoc report containing a second data element as a response to receiving data associated with selection of the first data element,
  the computer configured to drill from the first data element to the second data element along a drill path upon receipt of the data associated with selection of the first data element,
  the drill path created dynamically as a response to receiving data associated with selection of the first data element,
  the drill path created by using an original query associated with the first data element and system-provided suggestions indicating a data element selection to create a drill path that obtains a desired result, a first context of the data element selection, and a granularity of a destination query associated with the second data element,
  wherein the first ad-hoc report is dynamically generated based on the original query,
  wherein the instruction associated with the first data element is received via a user interface, and
  wherein upon receipt of an instruction associated with selection of the first data element, a first filter is applied; and subtracting the first filter upon receiving second data indicating the selection of a return to the first ad-hoc report, a second context thereafter being associated with the first ad-hoc report.

2. The system according to claim 1, the context of the selection corresponding to a row that the first data element resides in.

3. The system according to claim 1, wherein the second ad-hoc report is generated dynamically following of receipt of the instruction associated with the first data element.

4. The system according to claim 1, further comprising an additional ad-hoc report containing an additional data element, wherein the additional ad-hoc report is generated by the computer upon receipt of an instruction associated with of the second data element.

5. The system according to claim 1, wherein the first data element and the second data element are on different drill paths.

6. The system according to claim 1, wherein the first data element and the second data element are on the same drill path.

7. A computer-implemented method for drilling on at least one element in an arbitrary ad-hoc report, comprising:
 providing, by a computer, a first ad-hoc report with a first data element;
 configuring, by the computer, the first data element to be selected;
 drilling, by the computer, from the first data element to a second data element in a second ad-hoc report upon receiving an indication of a selection of the first data element via a user interface; and,
 generating the second ad-hoc report upon receipt of data indicating a selection of the first data element and the drilling is accomplished by drilling along a drill path,
 the drill path being created dynamically upon receipt of the data indicating a selection of through of one or more data elements, the drill path being created using an original query associated with the first data element and computer-provided suggestions indicating a data element selection and considering a first context of the selection and a granularity of a destination query associated with the second data element,
 wherein the providing of the first ad-hoc report comprises dynamically generating the first ad-hoc report based on the original query, and
 wherein upon receipt of the information indicating selection of the first data element, a first filter is applied; and subtracting the first filter upon receiving second data indicating the selection of a return to the first ad-hoc report, a second context thereafter being associated with the first ad-hoc report.

8. The method according to claim 7 further comprising from a first path wherein the first data element resides, to a second drill path wherein the second data element resides.

9. The method according to claim 7, further comprising drilling on a path containing both the first data element and the second data element.

10. The method according to claim 7, wherein the configuring comprises accounting for the context of the selection that corresponds to a row that the first data element resides in.

11. The method according to claim 7, further comprising dynamically generating the second ad-hoc report upon the selection of the first data element.

12. A computer readable storage medium excluding signals having stored thereon computer executable instructions that when processed by a computer cause said computer to:
 provide a first ad-hoc report with a first data element;
 generate a second ad-hoc report containing a second data element as a response to receiving data associated with selection of the first data element;
 drill from the first data element in the first ad-hoc report to the second data element in the second ad-hoc report, along a drill path, upon receipt of the data associated with selection of the first data element;
  the drill path created dynamically upon receipt of data indicating a selection of the first data element,
  the drilling created by using an original query associated with the first data element and computer-provided suggestions indicating a data element selection to create a drill path that obtains a desired result, and considers a context of a selection of the first data element and a granularity of a destination query associated with the second data element,
 apply a first filter corresponding to a first data element upon receipt of the data indicating the selection of a user of the first data element; and
 subtract the first filter upon receiving second data indicating the selection of a return to the first ad-hoc report, a second context thereafter being associated with the first ad-hoc report,
 wherein the first ad-hoc report is dynamically generated based on the original query, and
 wherein the instruction associated with the first data element is received via a user interface.

13. The computer readable storage medium according to claim 12 further comprising, across different paths.

14. The computer readable storage medium according to claim 12 further comprising, drilling along one path.

15. The computer readable storage medium according to claim 12, further comprising drilling following the selection of said one or more data elements by a user.

16. The computer readable storage medium according to claim 12, wherein the drilling results in generating the second ad-hoc report.

* * * * *